US012659236B2

(12) United States Patent
Krishnamurthy et al.

(10) Patent No.: US 12,659,236 B2
(45) Date of Patent: Jun. 16, 2026

(54) SERVICE MAPS FOR DISTRIBUTED NATIVE APPLICATIONS

(71) Applicant: Juniper Networks, Inc., Sunnyvale, CA (US)

(72) Inventors: Pradeep H. Krishnamurthy, Bangalore (IN); Raviraj Satish Deshmukh, Pune (IN); Ravikiran Krishnarao Kulkarni, Bangalore (IN); Aakash Naresh Soni, Ahmedabad (IN); Ayushi Tiwari, Jabalpur (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 35 days.

(21) Appl. No.: 18/758,930

(22) Filed: Jun. 28, 2024

(65) Prior Publication Data

US 2026/0005926 A1 Jan. 1, 2026

(51) Int. Cl.
H04L 41/22 (2022.01)
G06F 16/901 (2019.01)
(Continued)

(52) U.S. Cl.
CPC .......... H04L 41/12 (2013.01); G06F 16/9024 (2019.01); G06T 11/26 (2026.01); H04L 41/22 (2013.01); H04L 67/10 (2013.01)

(58) Field of Classification Search
None
See application file for complete search history.

(56) References Cited

U.S. PATENT DOCUMENTS 8,024,772 B1 * 9/2011 Yehuda ................. H04L 41/069
726/1
9,571,394 B1 2/2017 Sivaramakrishnan et al.
(Continued)

FOREIGN PATENT DOCUMENTS

CN 116455759 A 7/2023
WO 2013184846 A1 12/2013

OTHER PUBLICATIONS

Istio, "The Istio service mesh", Istio, Istio Authors, 2024, 4 pp., Retrieved from the Internet on Sep. 13, 2024 from URL: https://istio.io/latest/about/service-mesh/.
(Continued)

*Primary Examiner* — Jason D Cardone
(74) *Attorney, Agent, or Firm* — Shumaker & Sieffert P.A.

(57) ABSTRACT
A system includes a storage device including process information and connection information collected by one or more host modules at a plurality of compute nodes and processing circuitry in communication with the storage device. The processing circuitry is configured to associate, with each connection of one or more connections identified in the connection information, one or more applications, wherein each of the one or more applications is an application of a plurality of applications identified in the process information, determine whether each of the one or more applications is a server application or a client application based on the one or more connections, generate a service map comprising an edge representing each connection of the one or more connections and a node representing each server application and each client application of the one or more applications, and output an indication of the service map.

20 Claims, 8 Drawing Sheets

(51) Int. Cl.
 *G06T 11/26* (2026.01)
 *H04L 41/12* (2022.01)
 *H04L 67/10* (2022.01)

(56) References Cited

U.S. PATENT DOCUMENTS

| | | | |
|---|---|---|---|
| 10,230,568 B2 * | 3/2019 | Maes | G06F 11/3051 |
| 11,316,746 B1 * | 4/2022 | Bitterfeld | H04L 41/5009 |
| 11,405,291 B2 * | 8/2022 | Parandehgheibi | G06F 16/174 |
| 11,665,063 B1 * | 5/2023 | Luthra | H04L 67/10 |
| | | | 709/220 |
| 12,432,130 B2 * | 9/2025 | Raleigh | H04L 47/19 |
| 2004/0046785 A1 | 3/2004 | Keller | |
| 2019/0104023 A1 | 4/2019 | Rimar et al. | |
| 2020/0228414 A1 * | 7/2020 | Garty | H04L 43/045 |
| 2022/0376998 A1 * | 11/2022 | Vasseur | H04L 41/5067 |
| 2024/0394147 A1 * | 11/2024 | Tsuchiya | G06F 3/065 |
| 2025/0379792 A1 * | 12/2025 | Addaguduru | H04L 41/12 |

OTHER PUBLICATIONS

Extended Search Report from counterpart European Application No. 25184273.8 dated Nov. 13, 2025, 11 pp.

* cited by examiner

```
USER PID       %CPU %MEM VSZ    RSS   TTY    STAT START TIME  COMMAND
root 3062741   0.2  0.0  600776 57888 pts/1  Sl   Feb08 66:08 node DEV-dashboard.js
root 3062743   0.2  0.0  600776 58044 pts/1  Sl   Feb08 66:02 node QA-dashboard.js
root 3062745   0.2  0.0  601196 57920 pts/1  Sl   Feb08 66:46 node JTAC-dashboard.js
```

FIG. 3A

```
USER PID        %CPU %MEM VSZ    RSS   TTY    STAT START TIME  COMMAND
root 15455991   0.1  0.1  596676 51696 pts/1  Sl   Feb08 29:19 node DEV-db.js
root 15455993   0.1  0.1  596244 50536 pts/1  Sl   Feb08 27:43 node QA-db.js
root 15455995   0.1  0.1  596396 51036 pts/1  Sl   Feb08 29:02 node JTAC-db.js
```

FIG. 3B

| Proto | Recv-Q | Send-Q | Local Address | Remote Address | State | |
|---|---|---|---|---|---|---|
| tcp | 0 | 0 | 5.5.5.25:44622 | 6.6.6.27:9001 | ESTABLISHED | 3062741/node |
| tcp | 0 | 0 | 5.5.5.25:44628 | 6.6.6.27:9003 | ESTABLISHED | 3062743/node |
| tcp | 0 | 0 | 5.5.5.25:41174 | 6.6.6.27:9005 | ESTABLISHED | 3062745/node |

FIG. 4A

| Proto | Recv-Q | Send-Q | Local Address | Remote Address | State | |
|---|---|---|---|---|---|---|
| tcp6 | 0 | 0 | :::9001 | :::* | LISTEN | 1545991/node |
| tcp6 | 0 | 0 | :::9003 | :::* | LISTEN | 1545993/node |
| tcp6 | 0 | 0 | :::9005 | :::* | LISTEN | 1545995/node |
| tcp6 | 0 | 0 | 6.6.6.27:9001 | 5.5.5.25:44622 | ESTABLISHED | 1545991/node |
| tcp6 | 0 | 0 | 6.6.6.27:9003 | 5.5.5.25:44628 | ESTABLISHED | 1545993/node |
| tcp6 | 0 | 0 | 6.6.6.27:9005 | 5.5.5.25:41174 | ESTABLISHED | 1545995/node |

FIG. 4B

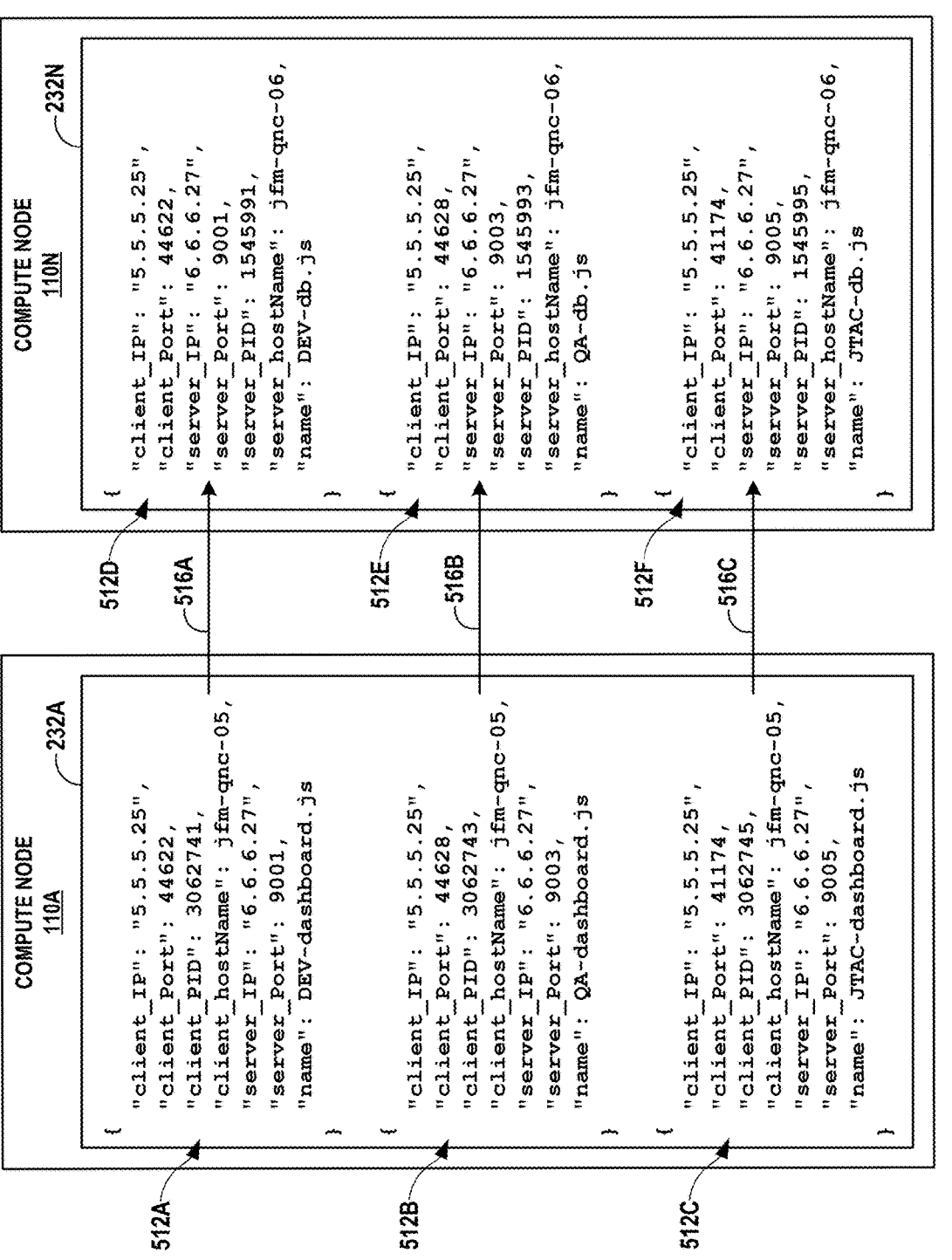

COMPUTE NODE
110N
232N

```
{
    "client_IP": "5.5.5.25",
    "client_Port": 44622,
    "server_IP": "6.6.6.27",
    "server_Port": 9001,
    "server_PID": 1545991,
    "server_hostName": jfm-qnc-06,
    "name": DEV-db.js
}
```
512D
516A

```
{
    "client_IP": "5.5.5.25",
    "client_Port": 44628,
    "server_IP": "6.6.6.27",
    "server_Port": 9003,
    "server_PID": 1545993,
    "server_hostName": jfm-qnc-06,
    "name": QA-db.js
}
```
512E
516B

```
{
    "client_IP": "5.5.5.25",
    "client_Port": 41174,
    "server_IP": "6.6.6.27",
    "server_Port": 9005,
    "server_PID": 1545995,
    "server_hostName": jfm-qnc-06,
    "name": JTAC-db.js
}
```
512F
516C

COMPUTE NODE
110A
232A

```
{
    "client_IP": "5.5.5.25",
    "client_Port": 44622,
    "client_PID": 3062741,
    "client_hostName": jfm-qnc-05,
    "server_IP": "6.6.6.27",
    "server_Port": 9001,
    "name": DEV-dashboard.js
}
```
512A

```
{
    "client_IP": "5.5.5.25",
    "client_Port": 44628,
    "client_PID": 3062743,
    "client_hostName": jfm-qnc-05,
    "server_IP": "6.6.6.27",
    "server_Port": 9003,
    "name": QA-dashboard.js
}
```
512B

```
{
    "client_IP": "5.5.5.25",
    "client_Port": 41174,
    "client_PID": 3062745,
    "client_hostName": jfm-qnc-05,
    "server_IP": "6.6.6.27",
    "server_Port": 9005,
    "name": JTAC-dashboard.js
}
```
512C

FIG. 5

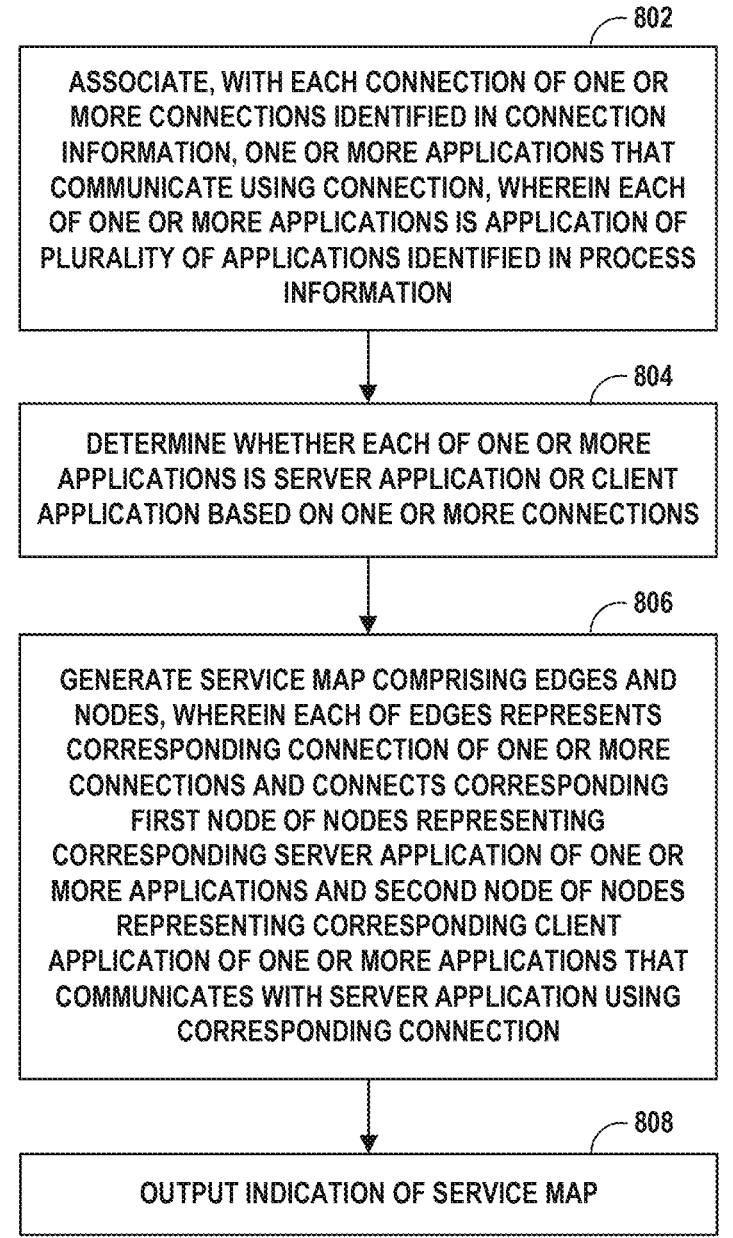

802

ASSOCIATE, WITH EACH CONNECTION OF ONE OR MORE CONNECTIONS IDENTIFIED IN CONNECTION INFORMATION, ONE OR MORE APPLICATIONS THAT COMMUNICATE USING CONNECTION, WHEREIN EACH OF ONE OR MORE APPLICATIONS IS APPLICATION OF PLURALITY OF APPLICATIONS IDENTIFIED IN PROCESS INFORMATION

804

DETERMINE WHETHER EACH OF ONE OR MORE APPLICATIONS IS SERVER APPLICATION OR CLIENT APPLICATION BASED ON ONE OR MORE CONNECTIONS

806

GENERATE SERVICE MAP COMPRISING EDGES AND NODES, WHEREIN EACH OF EDGES REPRESENTS CORRESPONDING CONNECTION OF ONE OR MORE CONNECTIONS AND CONNECTS CORRESPONDING FIRST NODE OF NODES REPRESENTING CORRESPONDING SERVER APPLICATION OF ONE OR MORE APPLICATIONS AND SECOND NODE OF NODES REPRESENTING CORRESPONDING CLIENT APPLICATION OF ONE OR MORE APPLICATIONS THAT COMMUNICATES WITH SERVER APPLICATION USING CORRESPONDING CONNECTION

808

OUTPUT INDICATION OF SERVICE MAP

FIG. 8

SERVICE MAPS FOR DISTRIBUTED NATIVE APPLICATIONS

TECHNICAL FIELD

The disclosure relates to computing systems and, more specifically, to managing network applications operating over a network.

BACKGROUND

In a typical data center environment, there is a large collection of interconnected servers that provide computing and/or storage capacity to run various applications. For example, a data center may comprise a facility that hosts applications and services for subscribers, i.e., customers of data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Some data centers may utilize virtualized environments in which virtual hosts, also referred to herein as virtual execution elements or workloads, such virtual machines or containers, are deployed and executed on an underlying compute platform of physical computing devices. Data centers may also include non-virtualized environments, such as bare metal workloads, which may run directly on physical computing devices without an intervening virtual machine or container. For example, on-premises or other data centers may host bare metal workloads such as database, application/business logic, front end applications, or various subsets thereof.

SUMMARY

In general, techniques are described for determining a service map for troubleshooting performance issues associated with bare metal workloads, which may run directly on physical computing devices of a computing infrastructure without an intervening virtual machine or container, also referred to herein as native applications. Example performance issues associated with native applications may include degradation (e.g., increased latency) of one or more services provided by the computing infrastructure. One of the key aspects of native application visibility is to render a service map which depicts the relationships (e.g., connections, dependencies) between applications. This is particularly useful in doing root cause analysis in case of triaging issues like slowness of applications due to an issue in a dependent application. Many on-premises data centers may include legacy applications (e.g., native applications), such as 3-tier web applications, that do not use containerized or other virtualized solutions (like KUBERNETES®, DOCKER®) at least in part. As such, the described techniques provide service maps for native applications.

The techniques provide one or more technical advantages that realize one or more practical applications. For example, a service map generated in accordance with the described techniques can be used identify anomalies and reconfigure the computing infrastructure to address the anomalies. Reconfiguration may include redeploying a native application to another compute node(s), reconfiguring network devices of a switch fabric of the compute nodes to address latency or bandwidth issues, restarting applications, or other actions.

In one example, a system includes a storage device including process information and connection information collected at a plurality of compute nodes, and processing circuitry in communication with the storage device, wherein the processing circuitry is configured to: associate, with each connection of one or more connections identified in the connection information, one or more applications that communicate using the connection, wherein each of the one or more applications is an application of a plurality of applications identified in the process information, determine whether each of the one or more applications is a server application or a client application based on the one or more connections, generate a service map comprising edges and nodes, wherein each of the edges represents a corresponding connection of the one or more connections and connects a corresponding first node of the nodes representing a corresponding server application of the one or more applications and a second node of the nodes representing a corresponding client application of the one or more applications that communicates with the server application using the corresponding connection, and output an indication of the service map.

In another example, a method includes associating, by processing circuitry and with each connection of one or more connections identified in connection information, one or more applications that communicate using the connection, wherein each of the one or more applications is an application of a plurality of applications identified in process information, the process information and the connection information collected at the plurality of compute nodes, determining, by the processing circuitry, whether each of the one or more applications is a server application or a client application based on the one or more connections, generating, by the processing circuitry, a service map comprising edges and nodes, wherein each of the edges represents a corresponding connection of the one or more connections and connects a corresponding first node of the nodes representing a corresponding server application of the one or more applications and a second node of the nodes representing a corresponding client application of the one or more applications that communicates with the server application using the corresponding connection, and outputting, by the processing circuitry, an indication of the service map.

In another example, non-transitory computer-readable storage media storing instructions that, when executed, cause processing circuitry to: associate, with each connection of one or more connections identified in connection information, one or more applications that communicate using the connection, wherein each of the one or more applications is an application of a plurality of applications identified in process information, the process information and the connection information collected at the plurality of compute nodes, determine whether each of the one or more applications is a server application or a client application based on the one or more connections, generate a service map comprising edges and nodes, wherein each of the edges represents a corresponding connection of the one or more connections and connects a corresponding first node of the nodes representing a corresponding server application of the one or more applications and a second node of the nodes representing a corresponding client application of the one or more applications that communicates with the server application using the corresponding connection, and output an indication of the service map.

The details of one or more examples are set forth in the accompanying drawings and the description below. Other features, objects, and advantages will be apparent from the description and drawings.

BRIEF DESCRIPTION OF DRAWINGS

FIG. 3A illustrates a first example of process information, according to techniques of this disclosure.

FIG. 3B illustrates a second example of process information, according to techniques of this disclosure.

FIG. 4A illustrates a first example of connection information, according to techniques of this disclosure.

FIG. 4B illustrates a second example of connection information, according to techniques of this disclosure.

FIG. 5 illustrates an example of service information, according to techniques of this disclosure.

FIG. 8 is a flowchart illustrating an example process for rendering service maps for distributed native applications, according to techniques of this disclosure.

Like reference characters denote like elements throughout the text and figures.

DETAILED DESCRIPTION

Figure 1:
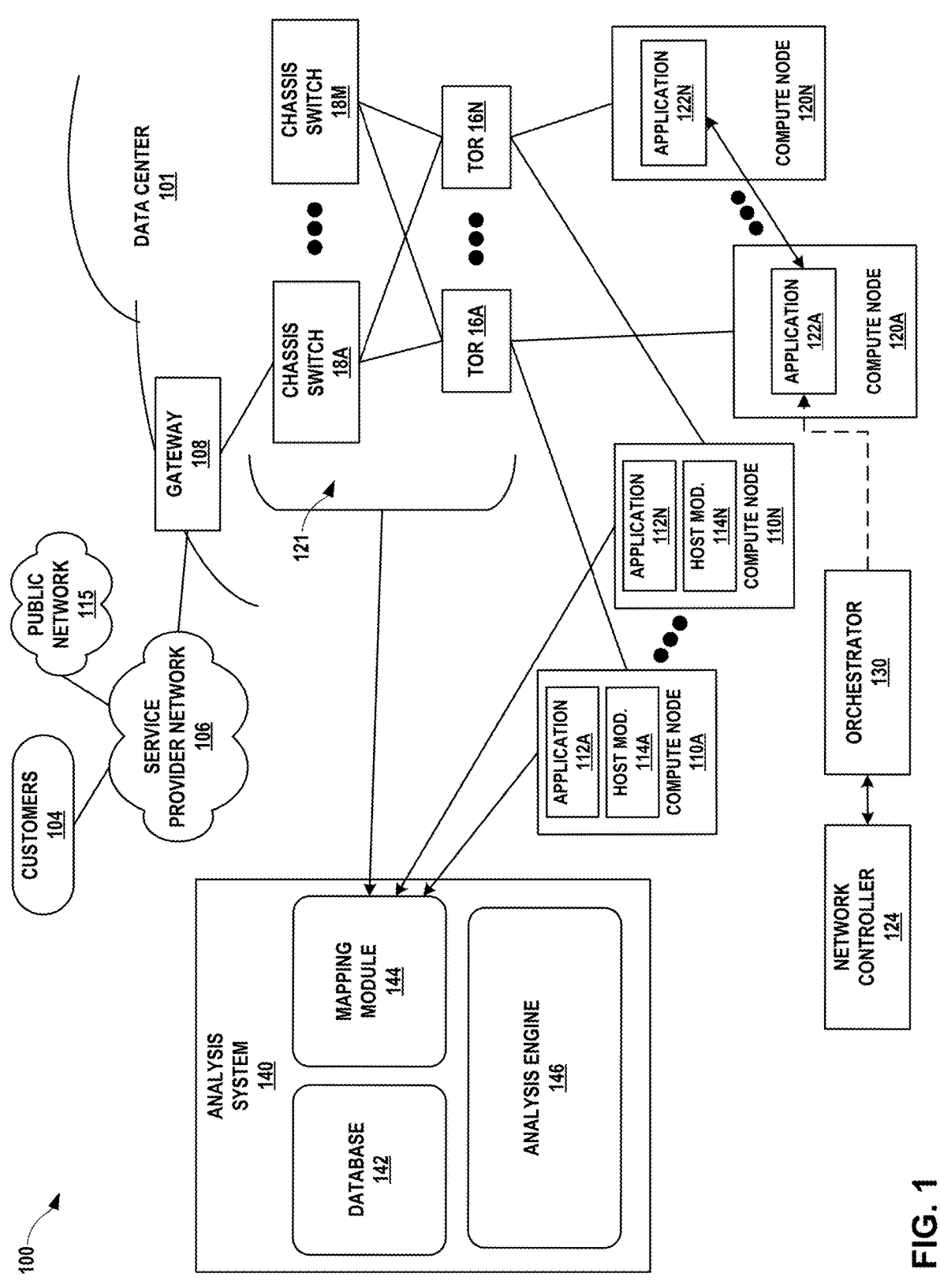
FIG. 1 is a block diagram illustrating an example computing infrastructure including elements monitored by an analysis system, according to techniques of this disclosure.

FIG. 1 is a block diagram illustrating an example computing infrastructure 100 including elements monitored by an analysis system 140, according to techniques of this disclosure. In computing infrastructure 100, data center 101 may provide an operating environment for applications and services for customer sites 104 (illustrated as "customers 104") having one or more customer networks coupled to the data center by service provider network 106. Data center 101 may, for example, host infrastructure equipment, such as networking and storage systems, redundant power supplies, and environmental controls. Service provider network 106 is coupled to public network 115, which may represent one or more networks administered by other providers, and may thus form part of a large-scale public network infrastructure, e.g., the Internet. Public network 115 may represent, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates service provider network 106, an enterprise IP network, or some combination thereof.

Although customer sites 104 and public network 115 are illustrated and described primarily as edge networks of service provider network 106, in some examples, one or more of customer sites 104 and public network 115 may be tenant networks within data center 101 or another data center. For example, data center 101 may host multiple tenants (customers) each associated with one or more virtual private networks (VPNs), each of which may connect with one of customer sites 104. Data center 101 may represent one or more data centers, which may in some cases be geographically distributed.

Service provider network 106 offers packet-based connectivity to attached customer sites 104, data center 101, and public network 115. Service provider network 106 may represent a network that is owned and operated by a service provider to interconnect a plurality of networks. Service provider network 106 may implement Multi-Protocol Label Switching (MPLS) forwarding and in such instances may be referred to as an MPLS network or MPLS backbone. In some instances, service provider network 106 represents a plurality of interconnected autonomous systems, such as the Internet, that offers services from one or more service providers.

In some examples, data center 101 may represent one of many geographically distributed data centers in which the techniques and systems described herein may be implemented. As illustrated in the example of FIG. 1, data center 101 may be a facility that provides network services, cloud services, storage services, and/or application services for customers. Data center 101 may represent an on-premises data center, a private cloud (or data center thereof), a public cloud (or data center thereof), a hybrid cloud (or data center thereof), or other type of deployment. A customer of the service provider may be a collective entity such as enterprises and governments or individuals. For example, a data center may host web services for several enterprises and end users. Other exemplary services may include data storage, virtual private networks, traffic engineering, file service, data mining, scientific- or super-computing, and so on. Although illustrated as a separate edge network of service provider network 106, elements of data center 101, such as one or more physical network functions (PNFs) or virtualized network functions (VNFs), may be included within the service provider network 106 core.

Switch fabric 121 may include interconnected top-of-rack (TOR) (or other "leaf") switches 16A-16N (hereinafter "TOR switches 16) coupled to a distribution layer of chassis (or "spine" or "core") switches 18A-18N (hereinafter "chassis switches 18"). Data center 101 may include gateway 108. Gateway 108 may include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Data center 101 may also include one or more physical network functions (PNFs) such as physical firewalls, load balancers, routers, route reflectors, broadband network gateways (BNGs), Evolved Packet Cores or other cellular network elements, and other PNFs.

The term "packet flow," "traffic flow," or simply "flow" refers to a set of packets originating from a particular source device or endpoint and sent to a particular destination device or endpoint. A single flow of packets may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet.

Any server of data center 101 may be configured with workloads by virtualizing resources of the server to provide an isolation among one or more applications (e.g., processes) executing on the server. "Hypervisor-based" or "hardware-level" or "platform" virtualization refers to the creation of virtual machines that each includes a guest operating system for executing one or more processes. In general, a virtual machine provides a virtualized/guest operating system for executing applications in an isolated virtual environment. Because a virtual machine is virtualized from physical hardware of the host server, executing applications are isolated from both the hardware of the host and other virtual machines. Each virtual machine may be configured with one or more virtual network interfaces for communicating on corresponding virtual networks.

In the example of FIG. 1, data center 101 includes storage and/or compute servers interconnected by one or more tiers of physical network switches and routers, with compute nodes 110A-110N (herein, "compute nodes 110") depicted as interconnected via TOR switches 16 and chassis switches 18. Compute nodes 110 may be bare metal machines within data center 101 and may also be referred to herein as "hosts 110" or "host devices 110." Compute nodes 110 may represent a computing device, such as an x86 processor-based server, configured to operate according to techniques described herein.

Compute nodes 110 may host network endpoints for one or more physical or virtual networks that operate over the physical network provided by TOR switches 16 and chassis switches 18. Although described primarily with respect to a data center-based switching network, other physical networks, such as service provider network 7, may underlay the one or more virtual networks.

Each of compute nodes 110 may host one or more native applications 112. The term native application as used herein refers to, e.g., a native workload, native process, or native services that executes in an execution environment provided by compute nodes 110 without any intervening virtual machine, container engine, or other virtualization environment. As such, native applications may execute directly in an execution environment of a host operating system running directly on compute nodes 110 (e.g., running on the "bare metal" of compute nodes 110). As shown in FIG. 1, compute node 110A hosts a native application 112A. However, a given compute node 110 may execute as many applications 112 as desired or as is practical given hardware resource limitations of the compute node 110.

Each of applications 112A-112N (collectively, "applications 112"), also referred to herein as native applications 112A-112N (collectively, "native applications 112"), may be deployed as one or more native workloads. Each workload may be an instance of the application. One or more of applications 112 may collectively implement one or more network applications that provide one or more services (e.g., database, business logic, front end/dashboard services). For example, a network application may include applications 112A-112N providing one or more services. Compute nodes 110 may execute one or more of applications 112 to provide or implement one or more services. Compute nodes 110 may host applications 112 for multiple different network applications, each corresponding to one or more services. In some examples, applications 112 of a network application may be distributed across compute nodes 110 managed by any combination of service providers, enterprises, or other entities. Such compute nodes 110 may be located in multiple different data centers, on-prem, or in private, public, or hybrid clouds. As used herein, a native network application may be a network application including exclusively or at least one native application 112.

Applications 112 may have distinct performance requirements that need to be met within a highly dynamic application execution environment. In such an environment, application performance may be an artifact of dynamics of different resources such as compute node resources; network resources (e.g., bandwidth, latency, loss, jitter, firewall policies), network policies, and the communication graph among different services of a network application; as well as the performance of external services such as authentication and external cloud services.

Applications 112 may communicate with each other as part of providing functionality for a network application. Each service of applications 112 may provide functionality for one or more components of a network application. For example, application 112A may provide functionality for one part of the network application, while application 112N provides functionality for a different part of the network application. Applications 112 may communicate with each other using calls, such as remote procedure calls (RPCs) communicated through network or other communication links. Applications 112 may communicate with each other along a chain of RPCs to provide the functionality of the network application. For example, application 112A may communicate with application 112N and send RPCs to application 112N as part of providing functionality of the network application.

Applications 112 may call each other in a path of RPC calls. For example, application 112B may call application 112C, which then calls application 112F. As part of providing the functionality of a network application, a series of services may call each other in turn. In some cases, application 112A is an entry endpoint service, application 112N is a terminating endpoint service, and one or more other services are called between application 112A and application 112N for an end-to-end call path for the network application.

A service request arriving at an entry point (e.g., application 112A or other endpoint) in distributed system may undergo multiple "hops" through numerous microservice operations before being fully serviced. The life of a request results in complex microservice interactions. These interactions may be deeply nested, asynchronous, and invoke numerous other downstream operations. As a result of this complexity, it may be very hard to identify which underlying applications 112 contribute to the overall end-to-end latency experienced by a top-level service request.

Compute nodes 110 may include one or more host modules 114A-114N (collectively, "host modules 114") that may collect data relating to compute nodes 110 and/or applications 112 to determine service information. As will be described further below, analysis system 140 may utilize the service information to generate a service map which may be used to identify the topology of applications 112. For example, analysis system 140 may generate a service map including a graphical representation of the topology of applications 112 (or other elements of computing infrastructure 100 or data center 101) where each application of applications 112 may be represented as a node and relationships (e.g., connections) between applications may be represented as edges between nodes. In some examples, the service map may provide a dependency graph for applications 112 in that the service map may show which of applications 112 are dependent on other applications 112. For instance, the service map may identify client applications 112 that depend on server applications 112 for operation. The service map may be used to manage applications 112 and troubleshoot anomalies (e.g., application, compute, network issues) related to applications 112. For example, the service map may be used to identify applications 112 that contribute to end-to-end latency experienced by a top-level service request.

In some examples, for each computing device 110, host module 114 may execute on the computing device 110 to obtain service information including connection information about connections (e.g., transmission control protocol (TCP) connections) that are present (e.g., open) at the computing device 110. The service information may identify, for each connection, a corresponding application 112 (e.g., process) using the connection and whether application 112 is running as a client or a server. As shown in FIG. 1, compute node 110A executes host module 114A. However, each of compute nodes 110 may each execute one or more host modules 114.

In some examples, host module 114 may obtain service information including connection information and/or process information for one or more applications 112 executed by compute node 110. The process information may identify applications 112 running at compute node 110. Table 1 and Table 2 below respectively provide examples of process information and connection information. The local address and remote address information list an IP address and port for the corresponding connection port.

TABLE 1

| Process ID | Process Name |
|---|---|
| 6742 | node DEV-dashboard.js |
| 6744 | node QA-dashboard.js |
| 6746 | node db.js |

TABLE 2

| Local Address | Remote Address | Process ID | State |
|---|---|---|---|
| 2.2.2.2:4001 | 3.3.3.3:6001 | 6742 | ESTABLISHED |
| 2.2.2.2:4002 | 3.3.3.3:6002 | 6744 | ESTABLISHED |
| :::8001 | :::* | 6746 | LISTENING |

Host module 114 may execute one or more commands (e.g., a "ps" and/or "netstat" command) to obtain service information at compute node 110. For instance, host module 114 may execute the "ps" command to identify running applications 112 at compute node 110 (e.g., process information) and execute the "netstat" command to identify connections present at compute node 110 (e.g., connection information). Service information may include an indication of one or more of applications 112 using a particular connection. For example, the service information of Table 2 include a process identifier (PID) for each connection that identifies an application of applications 112 using the connection. As can be seen, the service information may include an indication of whether or not a connection is a listening connection, which may indicate whether the corresponding application 112 is a server or client. In general, servers are applications 112 with listening connections as compared to clients, which are applications 112 with established connections that are not listening connections.

In some examples, host module 114 may identify process information (e.g., PID, process name, CPU utilization, memory utilization) on each compute node 110 in various ways. For instance, host module 114 may include OPEN-TELEMETRY® collector (OTEL collector) and execute the OTEL collector, with a hostmetrics receiver configuration, to collect process information, such as PIDs, process names, CPU utilization, and/or memory utilization. In some examples, host module 114, such as through the OTEL collector, may export collected logs in the form of metrics to other systems, such as various monitoring systems. For instance, the OTEL collector may have a filelogreceiver configuration to collect logs, parse/export logs as metrics, or both. Some examples of such monitoring systems include THANOS™ and PROMETHEUS™ Use of OTEL collector may avoid use and/or development of additional collector agents and also ephemeral storage like the Prometheus PushGateway. Host module 114 may, in some examples, read metrics from a file (e.g., read/parse a service log to obtain service information, such as metrics, therefrom).

Host module 114 may store service metrics (e.g., connection information and/or process information) obtained from compute node 110 to a storage device (e.g., memory, flash storage, magnetic storage), such as a storage device local to compute node 110, in the form of a service log, such as in a text file (e.g., log file), database, or other structured data format. Host module 114 may store a service log in a structured data format that permits analysis system 140, such as through mapping module 144, to parse the service log to identify individual service information from the service log.

In some examples, data center 101 may include compute nodes 110 hosting native workloads and, optionally, compute nodes 120A-120N (collectively, "compute nodes 120") that may host one or more virtual workloads. As shown in the example of FIG. 1, data center 101 includes storage and/or compute servers interconnected by one or more tiers of physical network switches and routers, with compute nodes 120 depicted as interconnected via TOR switches 16 and chassis switches 18. Each of compute nodes 120 may represent a computing device, such as an x86 processor-based server, configured to operate according to techniques described herein.

Each of compute nodes 120 may host one or more virtual workloads. The term virtual workload encompasses virtual machines, containers, Kubernetes Pods, and/or other virtualized computing resources that provide an at least partially independent virtualized execution environment for applications. As shown in FIG. 1, compute node 120A hosts a workload for application 122A. However, a compute node 120 may execute as many workloads as desired or as is practical given hardware resource limitations of the compute node 120. Although not shown in FIG. 1, any of compute nodes 110 or compute nodes 120 may host one or more native workload and one or more virtual workloads.

In some examples, computing infrastructure 100 may implement an automation platform that may automate deploy, scale, and operate virtual workloads across compute nodes 120 to provide physical or virtualized infrastructure for executing application workloads and services. In some examples, the platform may be a container orchestration platform that provides a container-centric infrastructure for automating deployment, scaling, and operations of containers to provide a container-centric infrastructure. "Orchestration," in the context of a virtualized computing infrastructure generally refers to provisioning, scheduling, and managing workloads and/or applications and services executing on such workloads to the host servers available to the orchestration platform. Container orchestration, specifically, permits container coordination and refers to the deployment, management, scaling, and configuration, e.g., of containers to host servers by a container orchestration platform. Example instances of orchestration platforms include Kubernetes, Docker swarm, Mesos/Marathon, OpenShift, OpenStack, VMware, and Amazon ECS.

Elements of the automation platform of computing infrastructure 100 include at least compute nodes 110 and, optionally, compute nodes 120, network controller 124, orchestrator 130, and analysis system 140. Virtual workloads may be deployed to a virtualization environment using a cluster-based framework in which a cluster master node of a cluster manages the deployment and operation of containers to one or more cluster minion nodes of the cluster. The terms "master node" and "minion node" used herein encompass different orchestration platform terms for analogous devices that distinguish between primarily management elements of a cluster and primarily workload hosting devices of a cluster. For example, the Kubernetes platform uses the terms "cluster master" and "minion nodes," while the Docker Swarm platform refers to cluster managers and cluster nodes.

In general, network controller 124 controls the network configuration of the data center fabric to, e.g., establish one or more virtual networks for packetized communications among virtual network endpoints. In some examples, network controller 124 provides a logically and in some cases physically centralized controller for facilitating operation of one or more virtual networks within data center 101. In some examples, network controller 124 may operate in response to configuration input received from orchestrator 130 and/or an administrator/operator. Additional information regarding example operations of an example network controller 124 operating in conjunction with other devices of data center 101 or other software-defined network is found in International Application No. PCT/US2013/044378, filed Jun. 5, 2013, and entitled "PHYSICAL PATH DETERMINATION FOR VIRTUAL NETWORK PACKET FLOWS;" and in U.S. patent application Ser. No. 14/226,509, filed Mar. 26, 2014, and entitled "TUNNELED PACKET AGGREGATION FOR VIRTUAL NETWORKS," each which is incorporated by reference as if fully set forth herein.

Orchestrator 130 controls the deployment, scaling, and operations of virtual workloads across clusters of servers and providing computing infrastructure, which may include container-centric computing infrastructure. Orchestrator 130 and, in some cases, network controller 124, may implement respective cluster masters for one or more Kubernetes clusters. As an example, Kubernetes is a container management platform that provides portability across public and private clouds, each of which may provide virtualization infrastructure to the container management platform. Orchestrator 130 may represent any of the above-listed orchestration platforms, e.g., Kubernetes.

One or more of applications 122A-122N (collectively, "applications 122"), also referred to herein as virtualized applications 122A-122N (collectively, "virtualized applications 122" may collectively implement a network application. The network application may include a collection of one or more applications 112, 122 at compute nodes 110, compute nodes 120, or both. For example, a network application may include applications 112A, 112N and virtualized applications 122A, 122N running respectively on compute nodes 110 and compute nodes 120. Each of applications 112, 122 may provide or implement one or more services, and where applications 122 represent Pods or other container deployments (e.g., virtual workloads), the one or more services are containerized services or "microservices". Compute nodes 110, 120 may host services for multiple different network applications each distributed with one or more services. In some examples, services of a network application are distributed across compute nodes 110, 120 managed by any combination of service providers, enterprises, or other entities. Such compute nodes may be located in multiple different data centers, on-prem, or in private, public, or hybrid clouds.

Orchestrator 130 may include a scheduler to schedule virtualized applications 122 to compute nodes 120. In general, orchestrator 130 may manage the placement of each of virtualized applications 122 to compute nodes 120 according to scheduling policies, the amount of resources requested for the service, and available resources of compute nodes 120. Compute node resources considered by orchestrator 130 when assigning applications 112 to compute nodes 120 include central processing unit (CPU) related resources (e.g., cores, CPU/core utilization), memory-related resources (available main memory, e.g., 2 GB), ephemeral storage, and user-defined extended resources. In Kubernetes for example, the scheduler is known as kube-scheduler.

Orchestrator 130, such as by virtue of scheduling virtualized applications 122, may store information suitable to generate a service map for virtualized applications 122 but not for native applications 112. may render a service map of virtualized applications 122 in some examples. Orchestrator 130 may utilize a service mesh solution, such as ISTIO®, to identify pod to pod communication in Kubernetes and/or an eBPF solution, such as PIXIE™ or COROOT™, which are also specific to virtualized applications 122 on Kubernetes. However, conventional analysis systems and orchestrators are incapable of generating a service map for native applications 112, at least for the reason that native applications 112 are not deployed or managed by orchestrator 130. Orchestrator 130 may not be capable of obtaining service information or other information relating to for native applications 112 that may be used to generate a service map for native applications 112.

Some systems other than orchestrator 130 may generate a kind of service map for native applications 112. However, such systems require users to manually provide application dependency mapping, require users to manually generate service maps for native applications, and/or require application developers to include instrumentation in the code of native applications 112, which may add latency to the code of native applications 112. In contrast, in accordance with the techniques described herein, compute nodes 110 may each include respective host modules 114 that may obtain service information for native applications 112 at compute nodes 110 without requiring the above-described manual user input or instrumentation. In this manner, host modules 114 may provide a nonintrusive reduced overhead approach decoupled from code (e.g., not requiring instrumentation or tracing). Compute nodes 110, such as through host modules 114, may send the service information to analytics system 140, in some cases in response to a request from analysis system 140. Analysis system 140 may process the service information obtained by host modules 114 to generate a service map for native applications 112, as will now be described in further detail below.

In some examples, analysis system 140 may execute as a network management application on one or more computing systems and/or compute nodes 110, 120 of data center 101. Analysis system 140 may however be deployed separately from data center 101. Analysis system 140 may be integrated as part of a telemetry system, a root cause determination system, or any system a network administrator may operate to analyze and monitor for computing infrastructure 100. As shown in the example of FIG. 1, analysis system 140 may include various modules, including an analysis engine 146, a mapping module 144, and a database 142, or various subsets thereof. Although shown as separate from orchestrator 130 and network controller 124, analysis system 140 may be integrated with either or both of orchestrator 130 and network controller 124.

Analysis system 140 may retrieve service information from elements of computing infrastructure 100, such as by retrieving service logs or other logs stored by such elements. These logs may include logs from different layers of computing infrastructure 100, such as service logs from an application layer (e.g., application 112), logs from a compute layer (e.g., compute nodes 110, 120), logs from a network layer (e.g., chassis switches 18 and TOR switches 16). Analysis system 140 may collect (e.g., receive) logs through mapping module 144 and analyze logs, such as for root cause analysis of performance issues related to network applications, with analysis engine 146. Mapping module 144 may store collected logs in a data store, such as database 142 or other structured data format. Though not described herein, in some examples, to generate a service map for the application layer, analysis system 140 may generate a service map for additional layers, including the compute layer, network layer, or both. In some examples, analysis system 140 may export collected logs to other systems, such as various monitoring systems. Some examples of such monitoring systems include THANOS and PROMETHEUS.

Network applications may include any one or more of native applications 112 (e.g., services or microservices) at data center 101 that rely on network resources to perform particular functions such as enabling communication, data sharing, and collaboration among network devices. In the example of FIG. 1 for instance, a network application may include one or more of applications 112A through application 112N.

The techniques disclosed herein include aspects that can be used to generate service maps for native applications 112 running on different compute nodes 110. For example, applications 112A, 112N running respectively on compute nodes 110A, 110N may be connected over a leaf-spine fabric as described above. In this example, computing node 110N may natively execute application 112N to provide backend services (e.g., database or business logic services) and compute node 110A may execute application 112A to provide front end services (e.g., user interfaces, dashboard applications).

Mapping module 144 may identify nodes and edges of a service map based on service information obtained from compute nodes 110. For example, host module 114 may be executed by each of compute nodes 110 to obtain service information for each compute node 110. Compute nodes 110, such as through respective host modules 114, may send the service information to mapping module 144 of analysis system 140. In some examples, mapping module 144 may receive service information from host module 114 in response to a request from mapping module 144, or host module 114 may send service information from computing nodes 110 to mapping module 114 automatically (e.g., periodically) without requiring receipt of a request from mapping module 144. Mapping module 144 may store service information, such as in database 142 or other structured data format.

Mapping module 144 may analyze the service information collected by host modules 114 to determine nodes (e.g., applications 112) and edges (e.g., connections between applications) for a service map of applications 112. As described above, service information may include process information identifying applications 112 running at compute node 110, connection information identifying connections opened by applications 112 at compute node 110, or both.

In some examples, mapping module 144 may combine various units of service information (e.g., process information and connection information) by correlating one or more metrics within units of service information. Referring to the examples of Table 1 and Table 2 for instance, mapping module 144 may correlate the process information and the connection information by a common identifier in the process information and the connection information, such as a PID. In this manner, mapping module 144 may identify the process information corresponding to each connection in the connection information, or the connection information corresponding to each process in the process information.

To illustrate, mapping module 144 may correlate the process information of Table 1 and the connection information of Table 2 by PID, resulting in service information such as shown below in the example of Table 3. As can be seen below, the service information of Table 3 includes the connection information and the process information of Tables 1 and 2, respectively, correlated (e.g., matched) by PID. Though shown as including a PID and process name for explanation purposes, the process information may include various information, such as the process owner, CPU time used, CPU utilization, start time, or parent process ID.

TABLE 3

| Local Address | Remote Address | PID | Process Name | State |
|---|---|---|---|---|
| 2.2.2.2:4001 | 3.3.3.3:6001 | 6742 | node DEV-dashboard.js | ESTABLISHED |
| 2.2.2.2:4002 | 3.3.3.3:6001 | 6744 | node QA-dashboard.js | ESTABLISHED |
| 3.3.3.3:6001 | :::* | 6746 | node db.js | LISTENING |

Analysis system 140, such as through mapping module 144, may generate a service map using the service information. Continuing the example of Table 3 for instance, mapping module 144 may generate a service map with a node representing each application 112 and an edge for each connection between applications 112. Mapping module 144 may include, such as at the nodes in the service map, process information related to each application 112, such as process name. Mapping module 144 may determine whether each application 112 is a server or client and include an indication of whether each application is a server or client in the service map, such as through a label for the node corresponding to each application 112. In general, a client application 112 may be dependent on a server application 112 for operation. For example, a client application 112 may be a dashboard or front end and a server application 112 may be a business locking, database, or other back end application 112. Mapping module 144 may generate edges in the service map representing connections between each application 112 as identified in the connection information. In some examples, mapping module 144 may identify application 112 as a server or client, in the service map, by including a directional indicator (e.g., an arrow) at an edge pointing toward applications 112 that are servers and pointing away from applications that are clients. In this manner, mapping module 144 may provide a dependency graph indicating the dependencies of applications 112 (e.g., client applications dependent on server applications)

With respect to the example of Table 3 for instance, process ID 6742 may identify a first application 112A, process ID 6744 may identify a second application 112B, and process ID 6746 may identify a third application 112C, running on one or more of compute nodes 110. Mapping module 144 may determine third application 112C is a server, as shown by the listening state of process ID 6746 and first and second applications 112A, 112B are clients, as respectively shown by the established state of process IDs 6742 and 6744. Second and third applications 112A, 112B have a remote address that is the local address of application 112C, namely 3.3.3.3:6001. As such, mapping module 144 may determine applications 112A, 112B are clients connected to the server of third application 112C (e.g., applications 112A, 112B consume server services provided by application 112C) and include, in the service map, a corresponding edge between nodes representing first application 112A and third application 112C and second application 112B and third application 112C.

Mapping module 144 may generate nodes for the service map where each node represents one of applications 112A-112C shown in Table 3. In this example, mapping module 144 may include at least a portion of the process information (e.g., process ID, process name, or both) at each node, such as to identify the application 112 corresponding to each node. In some examples, the process name may provide an indication of the type of service provided at the node (e.g., provided by corresponding application 112). For example, applications 112 in Table 3 are shown as NODE.JS® applications, with application 112A providing a development (dev) dashboard, application 112B providing a quality assurance (QA) dashboard, and application 112C providing database services. Mapping module 144 may generate edges for the service map based on relationships (e.g., connections, dependencies) between applications 112. As described above, analysis system 140 may generate an edge between application 112A and application 112C and another edge between application 112B and application 112C for example.

A service map generated in accordance with the described techniques can be used identify anomalies and reconfigure the computing infrastructure to address the anomalies. Reconfiguration may include redeploying a native application 112 to another compute node(s) 110, reconfiguring network devices of switch fabric 121 or compute node(s) 110 to address latency or bandwidth issues, restarting native applications 112, or other actions.

Figure 2:
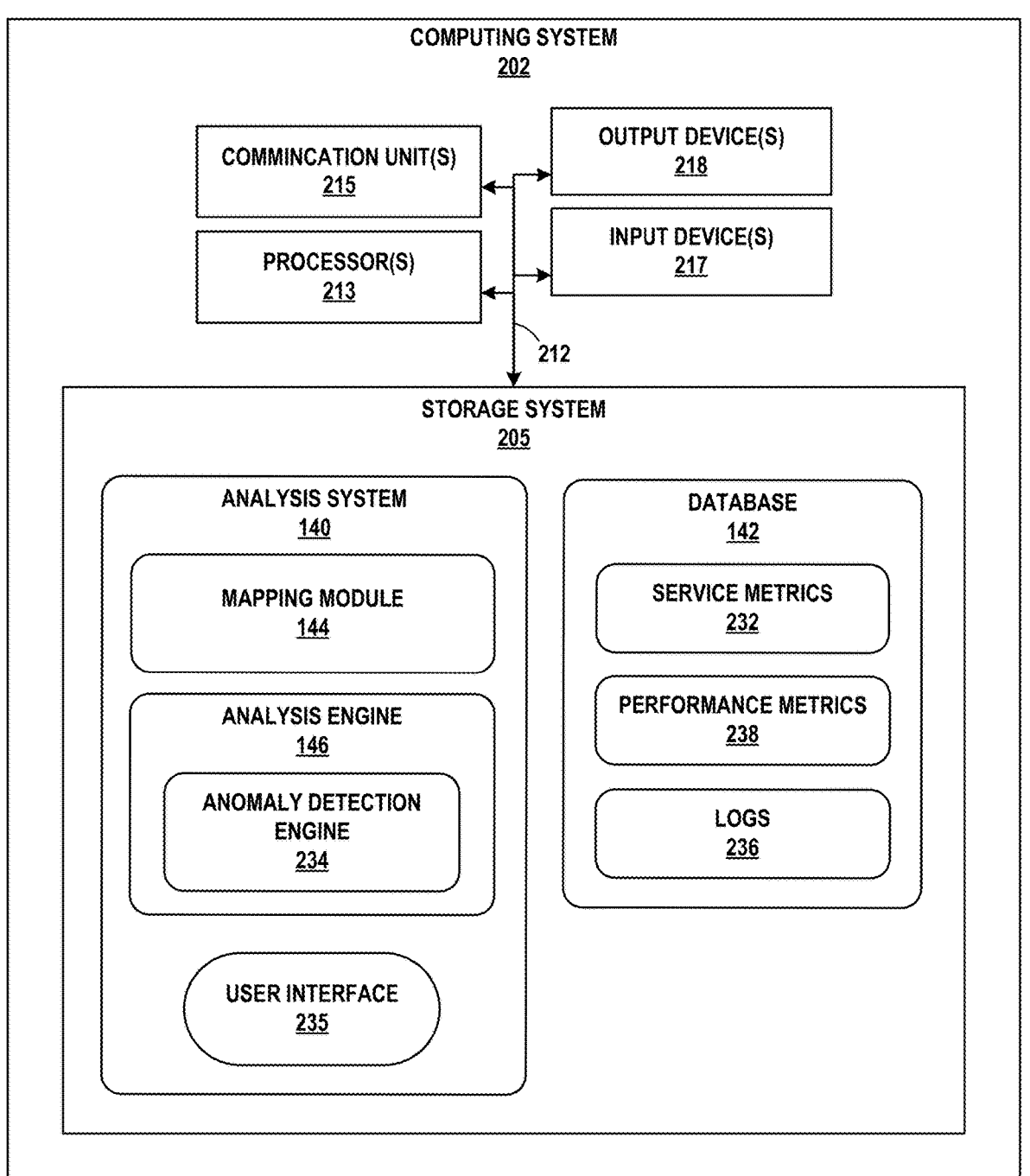
FIG. 2 is a block diagram illustrating an example set of components for the analysis system of FIG. 1, according to techniques of this disclosure.

FIG. 2 is a block diagram illustrating an example set of components for the analysis system of FIG. 1, according to techniques of this disclosure. Computing system implements an example instance of analysis system 140 of FIG. 1. Computing system 202 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 202 represents a cloud computing system, server farm, and/or server cluster (or portion thereof) that provides services to other devices or systems. In other examples, computing system 202 may represent or be implemented through one or more virtualized compute instances (e.g., virtual machines, containers) of a cloud computing system, server farm, data center, and/or server cluster.

In the example of FIG. 2, computing system 202 may include one or more processors 213, one or more communication units 215, one or more input devices 217, one or more output devices 218, and one or more storage systems 205. Storage system 205 may comprise various storage hardware, such as one or more magnetic, flash, optical or other storage devices. Communication channels 212 may interconnect one or more of the devices, modules, storage areas, or other components of computing system 202 to enable inter-component communications (physically, communicatively, and/or operatively). In some examples, communication channels 212 may represent one or more of a system bus, a network connection, an inter-process communication data structure, or any other method for communicating data.

One or more of processor(s) 213 may implement functionality and/or execute instructions associated with computing system 202 or associated with one or more modules illustrated herein and/or described below. One or more of processor(s) 213 may be, may be part of, and/or may include processing circuitry that performs operations in accordance with one or more aspects of the present disclosure. Examples of processor(s) 213 include microprocessors, application processors, display controllers, auxiliary processors, one or more sensor hubs, and any other hardware configured to function as a processor, a processing unit, or a processing device. Computing system 202 may use one or more processor(s) 213 to perform operations in accordance with one or more aspects of the present disclosure using software, hardware, firmware, or a mixture of hardware, software, and firmware residing in and/or executing at computing system 202.

One or more communication units 215 of computing system 202 may communicate with devices external to computing system 202 by transmitting and/or receiving data, and may operate, in some respects, as both an input device and an output device. In some examples, communication units 215 may communicate with other devices over a network. For instance, communication unit 215 may communicate service maps, service information, logs, and other data with other devices. In other examples, communication units 215 may send and/or receive radio signals on a radio network such as a cellular radio network. In other examples, communication units 215 of computing system 202 may transmit and/or receive satellite signals on a satellite network. Examples of communication units 215 include a network interface card (e.g., such as an Ethernet card), an optical transceiver, a radio frequency transceiver, a GPS receiver, or any other type of device that can send and/or receive information. Such communications may adhere to, implement, or abide by appropriate protocols, including Transmission Control Protocol/Internet Protocol (TCP/IP), Ethernet, or other technologies or protocols.

One or more input devices 217 may represent any input devices of computing system 202 not otherwise separately described herein. Input devices 217 may generate, receive, and/or process input. For example, one or more input devices 217 may generate or receive input from a network, a user input device, or any other type of device for detecting input from a human or machine.

One or more output devices 218 may represent any output devices of computing system 202 not otherwise separately described herein. Output devices 218 may generate, present, and/or process output. For example, one or more output devices 218 may generate, present, and/or process output in any form. Output devices 218 may include one or more USB interfaces, video and/or audio output interfaces, or any other type of device capable of generating tactile, audio, visual, video, electrical, or other output. Some devices may serve as both input and output devices. For example, a communication device may both send and receive data to and from other systems or devices over a network.

One or more storage devices of storage system 205 within computing system 202 may store information for processing during operation of computing system 202. Storage system 205 may store program instructions and/or data associated with one or more of the modules described in accordance with one or more aspects of this disclosure. One or more processors 213 and one or more storage devices may provide an operating environment or platform for such modules, which may be implemented as software, but may in some examples include any combination of hardware, firmware, and software. One or more processors 213 may execute instructions and one or more storage devices of storage system 105 may store instructions and/or data of one or more modules, including analysis system 140, mapping module 144, database 142, analysis engine 146, and user interface 235 as well as modules or other elements thereof. One or more storage devices of storage system 205 may store service information 232, performance metrics 238, logs 238, or various subsets thereof such as in database 142 or other structured data format.

The combination of processors 213 and storage system 205 may retrieve, store, and/or execute the instructions and/or data of one or more applications, modules, or software. Processors 213 and/or storage devices of storage system 205 may also be operably coupled to one or more other software and/or hardware components, including, but not limited to, one or more of the components of computing system 202 and/or one or more devices or systems illustrated as being connected to computing system 202.

Processors 213 may execute analysis system 140. As described above, analysis system 140 may generate service maps for native applications. For example, analysis system 140, such as through mapping module 144, may utilize service information 232, including process information, connection information, or both, received from compute nodes 110 to generate a service map which may be used to identify an application topology for applications 112. The service map may identify applications 112 at compute nodes 110 and the relationships (e.g., connections, dependencies) between applications 112 (e.g., client applications may connect to and depend on services from server applications). As such, the service map may provide a dependency graph that may be used to manage applications 112 and troubleshoot anomalies related to applications 112. In some examples, analysis engine 146 of analysis system 140 may use the service map to identify applications 112 that contribute to end-to-end latency experienced by a top-level service request. Analysis engine 146 may monitor the performance of various network applications and underlying services implemented by applications 112 illustrated in FIG. 1.

Analysis engine 146 may collect performance metrics 238, such as in the form of telemetry data from various sources throughout computing infrastructure 100. For example, analysis engine 146 may collect telemetry data such as logs, traces, and metrics. Performance metrics 238 may include key performance indicators (KPIs) monitored for layers of computing infrastructure 100. For example, performance metrics 238 may include application KPIs, compute KPIs, and network KPIs configured to measure latency, jitter, packet loss, throughput, network speed, bandwidth, network availability, packet duplication, packet reordering, packet rate, interface flap, processor utilization, memory utilization, user quality experience, network congestion, round-trip time, network utilization, network error rate, network response time, or the like throughout layers of computing infrastructure 100.

Analysis engine 146 may collect or receive performance metrics 238 for applications 112 at compute nodes 110 from compute nodes 110. For example, analysis engine 146 may collect performance metrics 238 including compute resource utilization (e.g., CPU utilization), memory utilization, network utilization (e.g., bandwidth utilization), network performance (e.g., latency), and the like from compute nodes 110. In some examples, performance metrics 238 may identify application 112, such as by PID, and analysis engine 146 may correlate such performance metrics 238 to application 112. Host modules 114 may execute at compute nodes 110 to obtain performance metrics 238 for respective compute nodes 110. Host modules 114 may store performance metrics 128 at compute nodes 110, such as in the form of service or other logs that may be sent to or collected by analysis system 140, such as described above.

Anomaly detection engine 234 of analysis engine 146 may determine performance issues of network applications. Anomaly detection engine 234 may determine performance issues (e.g., degradation in response time or latency) for network applications, such as by determining anomalies (e.g., response time or latency degradation) at applications 112 of FIG. 1. For example, anomaly detection engine 234 may determine an anomaly for a network application based on performance metrics 238 for applications 112 included in the network application. Anomaly detection engine 234 may determine a performance issue based on thresholds of KPIs included in performance metrics 238. For example, anomaly detection engine 234 may determine an anomaly for a network application when latency (e.g., response time) for application 112A is satisfies a KPI threshold (e.g., more than 100 milliseconds (ms)).

In some instances, anomaly detection engine 234 may determine a performance issue that is not triggered by KPI values included in performance metrics 238. For example, anomaly detection engine 234 may determine a performance issue of a network application based on feedback from a user or administrator indicating the performance issue (e.g., high latency at a particular application 112 of the network application). Anomaly detection engine 234 may generate anomaly logs based on KPIs included in performance metrics 238 to determine whether additional or different KPIs for a particular layer should be measured to detect the performance issue. Analysis engine 146 may store time series data associated with KPIs of various layers in performance metrics 238. Analysis engine 146 may store logs for various layers of computing structure 100 in database 142. For example, analysis engine 146 may store logs 236 from an application layer, compute layer, and network layer in database 142.

User interface (UI) 235 of analysis system 140 may generate user interfaces that include one or more visual elements. For example, UI 235 may generate a user interface that includes one or more visual elements, with each visual element corresponding to a node, edge, or other element of a service map. UI 235 may generate a user interface that includes a visual element associated with an alert indicating that a network device underlying the critical path is experiencing an anomaly (e.g., high latency).

Analysis system 140 may output a user interface via output devices 218. Analysis system 240 may output a user interface generated by UI 235 for display to a user for use in troubleshooting applications 112. For example, UI 235 may generate a user interface and cause output devices 218 to display a user interface that includes a service map with a visual indicator of an alert regarding a node (e.g., application 112) included in the service map is experiencing anomalous behavior. In another example, UI 235 may generate a user interface that includes a visual representation of the communication between applications 112 (e.g., client and server communication) and/or between applications 112 and underlying network infrastructure (e.g., compute nodes 110, chassis switches 18, TOR switches 16). UI 235 may generate an interactive user interface that allows a user to select nodes (e.g., applications 112), edges, or both of the service map. In response to such selection, UI 236 may display additional information about the selected node (e.g., performance metrics 238, service information 232) or edge (e.g., performance metrics 238, service information 232).

FIG. 3A illustrates a first example of process information, according to techniques of this disclosure. In general host module 114 may obtain service information about the host that is executing host module 114. For example, host module 114A may obtain service information for compute node 110A and host module 114N may obtain service information for compute node 110N. The example of FIG. 3A illustrates an example of service information (e.g., process information) that may be obtained by a particular example of host module 114.

In some examples, host module 114 may include one or more scripts, such as shell scripts, that host module 114 may execute to obtain process information at compute node 110. A script may include instructions (e.g., scripting language statements) that, when executed, cause compute node 110 to output process information. Referring to the example of FIG. 3A for instance, host module 114 may include instructions to run the command line program "ps" to obtain the process information shown in FIG. 3A.

Host module 114 may pass various parameters when running commands, such as to obtain particular process information. For example, host module 114 may run "ps aux" where "aux" specifies that the "ps" command should output all processes with a terminal, user processes, and processes without a terminal. Host module 114 may filter the process information such that only relevant or desired process information is obtained. For example, host module 114 may include an instruction to filter the process information for NODE-JS applications, such as by executing "ps aux|grep node" to obtain the process information filtered to include only the process information having the keyword "node," such as shown in FIG. 3A.

As described above, the process information may include various information relating to applications 112 (e.g., processes) at compute node 110. In the example of FIG. 3A for instance, host module 114A obtains, at compute node 110A, process information including a user identifier, PID, CPU utilization, memory utilization, resident set size (RSS) indicating the allocated physical memory, TeleTYpewriter (TTY) information indicating the terminal screen for the process, if any, status of the application (e.g., sleeping(S), idle, running (R), multi-threaded (l), stopped (T), etc.), start time, elapsed time (e.g., CPU time used by the application), and the command which initiated the application, shown respectively in the "USER," "PID," "% CPU," "% MEM," "VSZ," "RSS," "TTY," "STAT," "START TIME," and "COMMAND" columns of FIG. 3A. Though described as including particular information, the process information may include other information such as the host name (e.g., compute node name) for each process identified in the process information.

As can be seen, in the example of FIG. 3A, host module 114A obtains process information for three applications 112, identified respectively by PIDs 3062741, 3062743, 3062745. As can be seen, applications 112 with PIDs 3062741, 3062743, 3062745 are NODE-JS applications and were respectively initialized (e.g., spawned) using "node DEV-dashboard.js," "node QA-dashboard.js," and "node JTAC-dashboard.js" commands.

FIG. 3B illustrates a second example of process information, according to techniques of this disclosure. The process information of the example of FIG. 3B contains the same types of process information as the process information of FIG. 3A and may be obtained similarly as described with respect to FIG. 3A above. For example, host module 114N may execute a script, a filtered or unfiltered "ps" command, or both at compute node 110N to obtain the process information of FIG. 3B. As can be seen, in the example of FIG. 3B, host module 114 obtains process information for three applications 112, identified respectively by PIDs 1545991, 1545993, 1545995. Applications 112 with PIDs 1545991, 1545993, 1545995 are NODE-JS applications and were respectively initialized (e.g., spawned) using "node DEV-db.js," "node QA-db.js," and "node JTAC-db.js" commands.

FIG. 4A illustrates a first example of connection information, according to techniques of this disclosure. The example of FIG. 4A illustrates an example of service information (e.g., connection information) that may be obtained by a particular example of host module 114. For instance, host module 114A may include one or more scripts, such as shell scripts, that host module 114 may execute to obtain connection information at compute node 110A. Similar to above, the script may include instructions (e.g., scripting language statements) that, when executed, cause compute node 110 to output connection information. Referring to the example of FIG. 4A for instance, host module 114 may include instructions to run the command line program "net-stat" to obtain the connection information shown in FIG. 4A.

Host module 114 may pass various parameters when running commands, such as to obtain particular connection information. For example, host module 114 may run "net-stat-anp" where "-anp" specifies that the "netstat" command should output all connections and include numerical network addresses and PIDs. Host module 114 may filter the process information such that only relevant or desired connection information is obtained. For example, host module 114 may include an instruction to filter the connection information, such as by executing "netstat -anp|grep -e 3062741, 3062743, 3062745" to obtain the connection information filtered to include only the connection information having PIDs 3062741, 3062743, 3062745 such as shown in FIG. 4A. As another example, host module 114 may run "netstat-lnp" where "-lnp" specifies that the "netstat" command should output all listening connections and include numerical network address and PIDs. Host module 114 may run this or a similar command to obtain connection information including listening connections (e.g., connections with listening ports) from compute device 110. In the example of FIG. 4A, no connections are listening connections and, as such, host module 114A would identify no listening connections (e.g., no server applications) at compute node 110A in such case.

As described above, the connection information may include various information relating to connections used by applications 112 at compute node 110. In the example of FIG. 4A for instance, host module 114A obtains, from compute node 110A, connection information including protocol information, bytes received and buffered, bytes ready for sending, local address information, remote address information, and state information, shown respectively in the "Proto," "Recv-Q," "Send-Q," "Local Address," "Remote Address," and "State" columns of FIG. 4A. The state information may indicate whether a connection is a listening connection as compared to an established connection. The connection information, such as in the state information, may identify application 112 corresponding to (e.g., using) the connection, such as by PID.

As can be seen, in the example of FIG. 4A, host module 114A obtains connection information for three applications 112 at compute node 110A, identified respectively by PIDs 3062741, 3062743, 3062745. As can be seen, applications 112 with PIDs 3062741, 3062743, 3062745 include established TCP connections with respective local addresses of 5.5.5.25:44622, 5.5.5.25:44628, and 5.5.5.25:41174. The connections connect to respective remote addresses of 6.6.6.27:9001, 6.6.6.27:9003, 6.6.6.27:9005. Host module 114A may determine applications 112 with PIDs 3062741, 3062743, 3062745 are client applications because these applications 112 have established connections as compared to listening connections.

FIG. 4B illustrates a second example of connection information, according to techniques of this disclosure. The connection information of FIG. 4B contains the same types of connection information as the connection information of FIG. 4A and may be obtained similarly as described with respect to FIG. 4A above. For example, host module 114N may execute a script, a filtered or unfiltered "netstat" command, or both to obtain the connection information of FIG. 4B. As can be seen, in the example of FIG. 4B, host module 114N obtains, for compute node 110N, connection information for three applications 112, identified respectively by PIDs 1545991, 1545993, 1545995. Host module 114N may determine applications 112 with PIDs 1545991, 1545993, 1545995 as server applications in that these applications 112 include listening connections at local addresses/ports :::9001, :::9003, and :::9005. In the example of FIG. 4B, applications 112 with PIDs 1545991, 1545993, 1545995 also have established connections with applications 112 having PIDs 3062741, 3062743, 3062745 of FIG. 4A. As such, analysis system 140, such as through mapping module 144, may determine applications 112 with PIDs 3062741, 3062743, 3062745 are client applications dependent on (e.g., consuming services) applications 112 with PIDs 1545991, 1545993, 1545995.

Though described above as utilizing particular techniques (e.g., scripts, shell scripts, command line programs), host module 114 may utilize various techniques to obtain service information (e.g., process information, connection information, or both). For instance, in some examples, host module 114 may utilize Berkeley Packet Filter (BPF) to tap (e.g., obtain) process information, connection information, or both directly from the operating system of compute nodes 110. Host module 114 may apply various filters and/or parameters to BPF to obtain process information and/or connection information suitable for use in rendering service maps for native applications 112 as described herein. For example, host module 114 may obtain, from BPF, process information and connection information having similar information as that of the examples of process information and connection information described above.

Host module 114 may obtain various information from compute nodes 110 besides the process information and the connection information described above. In some examples, host module 114 may obtain host information about its host (e.g., compute node 110). For instance, host module 114 may obtain the operating system, hardware configuration (e.g., CPU model, memory/storage capacity, network interface cards), and the like, such as by running one or more scripts or through BPF.

Host module 114 may write obtained service information, whether obtained from BPF or through other techniques, to the service log, send the service information to analysis system 140, or both. Host module 114 may store the service log in a structured data format that permits analysis system 140, such as through mapping module 144, to parse the service log and obtain service information from the service log.

Host module 114 may identify tuples of information in the service information and write the tuples to the service log. For example, host module 114 may identify an n-tuple from the process information, the connection information or both, such as by parsing the process information, the connection information, or both outputted by compute node 110. For instance, host module 114 may identify the 2-tuple: <PID, COMMAND> from the process information outputted by the "ps" command and identify the 6-tuple: <client address, client port, client PID, server address, server port, server PID> from the connection information outputted by the "netstat" command. As described above, when a local connection is identified in the connection information as a listening connection (e.g., local port is listening for incoming connections), host module 114 may identify the corresponding application 112 (e.g., application 112 with a matching PID) as a server.

Host module 114 may apply some transformation to the service information in writing to the service log. For example, for the above 6-tuple, host module may use a PID as a server or client PID based on whether host module 114 determines the PID is that of a server or client application. In such case, host module 114 may use, in the 6-tuple, the PID as the server PID when the application is a server application and use the PID as the client PID when the application is a client application. Host module 114 may write the 6-tuple to storage, such as in the service log.

In some examples, some functionality may be distributed to analysis system 140 rather than host modules 114. For instance, analysis system 140 rather than host modules 114 may parse service information (e.g., process information and/or connection information). For example, host modules 114 may obtain the service information and send the service information to analysis system 140. In this example, analysis system 140, such as through mapping module 144, may identify the various n-tuples of information by parsing the service information received from host modules 114.

FIG. 5 illustrates examples of service information 232A-232N (collectively, "service information 232"), according to techniques of this disclosure. As can be seen, service information 232 of FIG. 5 correspond to the connection information of FIG. 4A and service information 232B correspond to the connection information of FIG. 4B. Though illustrated in JavaScript Object Notation (JSON) format, service information 232 may be formatted according to various structured data formats. Host module 114A may obtain service information 232A from compute node 110A and host module 114N may obtain service information 232N from compute node 110N.

As can be seen, host module 114A determines applications 112 with PIDs 3062741, 3062743, 3062745 to be client applications, as indicated by the "client_PID" field in service information 232A. As described above, host module 114 may determine applications 112 without listening connections are clients. Continuing this example, host module 114 has determined applications 112 with PIDs 1545991, 1545993, 1545995 to be servers, as indicated by the "server_PID" field in service information 232B. As described above, host module 114 may determine applications 112 with listening connections (e.g., listening ports) are servers.

Host module 114 may identify an n-tuple including the connection information. For example, host modules 114A, 114N may each identify a 6-tuple: <client address, client port, client PID, server address, server port, client/server hostname, client/server PID> from the connection information. As shown in the example of FIG. 5, service information 232 include the information of these 6-tuples, which host module 114 may parse or transform to generate the 6-tuples. In some cases, host module 114 may correlate various service information. For example, host module 114 may correlate process information, such as the process information of FIGS. 3A-3B, with the connection information to determine a name for each node. As shown in the example of FIG. 5 for instance, host module 114 may correlate the process information of FIGS. 3A-3B by PID to identify a name for each application 112 represented by nodes 512A-512F (collectively, "nodes 512"), also referred to herein as application layer nodes 512A-512F (collectively, "application layer nodes 512"). As can be seen, in FIG. 5, the "name" field for each node 512 corresponds to the COMMAND column of the process information of FIGS. 3A-3B correlated by PID. For example, host module 114 may correlate the process information of FIG. 3A by PID to assign names to nodes 512A-512C. As such, for instance, host module 114 assigns the name "DEV-dashboard.js" to node 512A because the process information for PID 3062741 includes "DEV-dashboard.js" in the COMMAND column for PID 3062741. Similarly host module 114 assigns the name "DEV-db.js" to node 512D because the process information for PID 1545991 includes "DEV-db.js" in the COMMAND column for PID 1545991.

Mapping module 144 may analyze the service information 232 collected by host modules 114 to determine nodes 512 representing respective applications 112 and edges 516A-516C (collectively, "edges 516") representing the relationship between applications 112, to render a service map for applications 112. Mapping module 144 may, for example, identify nodes 512 based on PIDs and edges 516 based on connection information between the PIDs. In the example of FIG. 5 for instance, each node 512 corresponds to a PID of a respective application 112 and each edge 516 corresponds to a connection between nodes 512 as indicated by the connection information. For instance, edge 516A represents a connection between nodes 512A, 512D. As can be seen, the 4-tuples <client address, client port, server address, server port> for nodes 512A, 512D correspond to one another indicating that node 512A has a connection to node 512D, with node 512D representing a server application and node 512A representing a client application.

More specifically, node 512D may represent application 112N with a PID of 1545991 having the server address and port of "6.6.6.27:9001." Application 112N includes the client address and port of "5.5.5.25:44622" which corresponds to the client address and port of application 112A with the PID of 3062741 of node 512A. Similarly, node 512A may represent application 112A with the PID of 3062741 having the client address and port of "5.5.5.25:44622." Application 112A includes the server address and port of "6.6.6.27:9001" which corresponds to the server address and port of application 112N with the PID of 1545991 of node 512D. Because node 512A has a server address and port matching that of node 512D and/or node 512D has a client address and port matching that of node 512A, nodes 512A, 512D may be considered connected as shown by edge 516A. Similar correspondence can be seen between nodes 512B, 512E and nodes 512C, 512F and their respective edges 516B, 516C in the example of FIG. 5.

Figure 6:
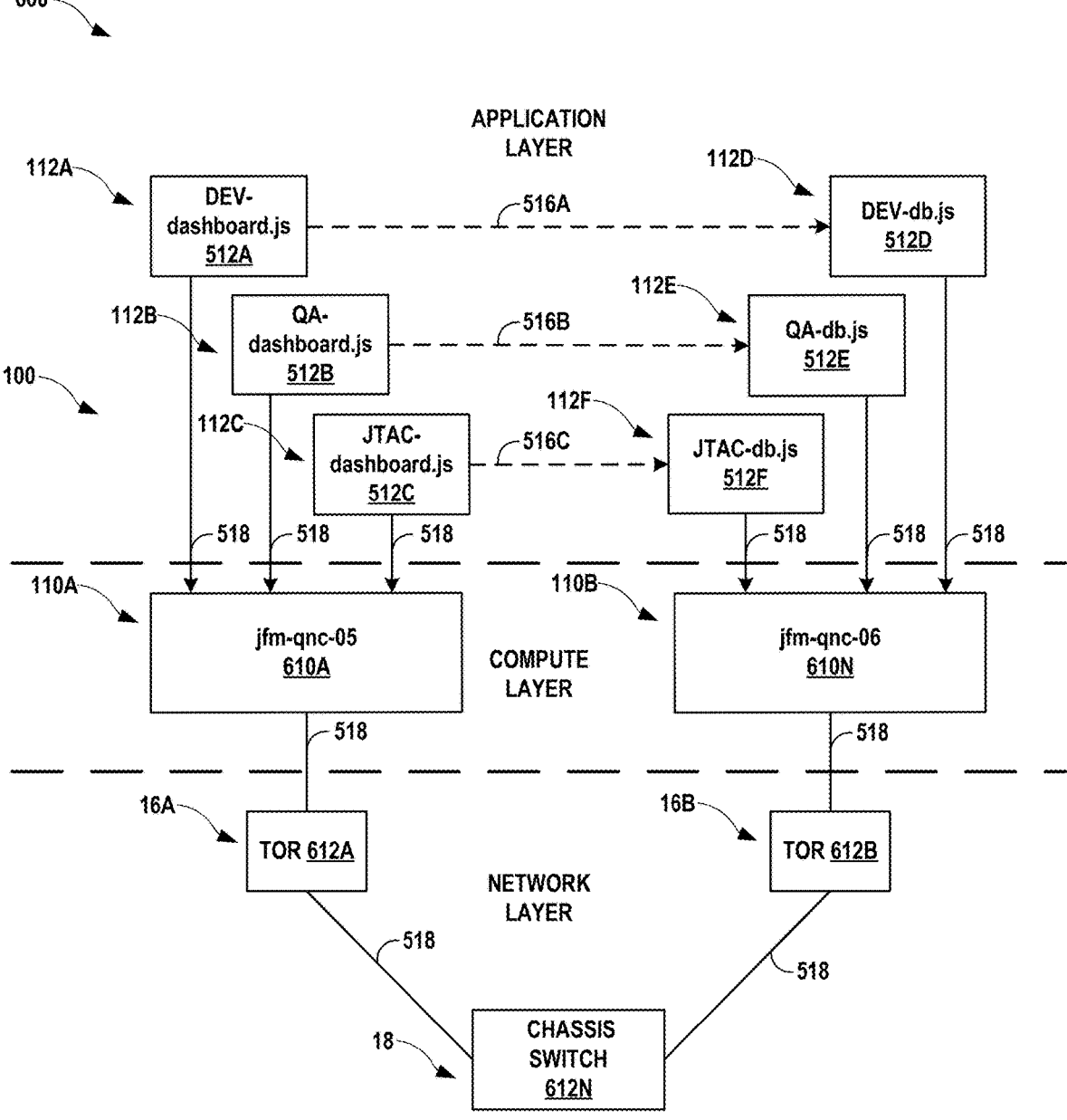
FIG. 6 is a block diagram illustrating a first example of a service map, according to techniques of this disclosure.

FIG. 6 is a block diagram illustrating a first example of a service map 600, according to techniques of this disclosure. Service map 600 may be displayed to a user, such as through user interface 235 and output device 218 of analysis system 140. Analysis system 140 may output service map 600 through one or more output devices 218, such as a display screen, or may send service map 600 to user's device (e.g., laptop, desktop, mobile device) for presentation, such as through communication unit 215.

Mapping module 144 may render (e.g., generate), using service information, service map 600 including various nodes, including nodes 512 representing applications 112, and various edges, including edges 516 representing relationships (e.g., connections, dependencies) between applications 112 or other elements of data center 101. In the example of FIG. 6, mapping module 144 generates service map 600 using service information 232 of FIG. 5. As can be seen, nodes 512A-512F respectively represent applications 112A-112F. Mapping module 144 may identify applications 112 in service map 600. For example, mapping module 144 may identify applications 112 by including the name of applications 112 in service map 600. As can be seen in the example of FIG. 6 for instance, each of nodes 512A-512F includes the name of the corresponding application 112 as indicated in the service information, respectively, "DEV-dashboard.js," "QA-dashboard.js," "JTAC-dashboard.js," "DEV-db.js," "QA-db.js," and "JTAC-db.js."

Edges 516 may represent connections or dependencies between applications 112. As can be seen, application 112A, "DEV-dashboard.js," has a connection to application 112D, "DEV-db.js," application 112B, "QA-dashboard.js," has a connection to application 112E, "QA-db.js," and application 112C, "JTAC-dashboard.js," has a connection to application 112F, "JTAC-db.js." Mapping module 144 may include a directional or other indicator at edge 516, such as to indicate a dependency between applications 112. For example, in FIG. 6, mapping module 144 includes an arrow at edges 516 to indicate the dependency of applications 112A-112C, namely, applications 112A-112C are dependent on services (e.g., database services) from applications 112D-112F. In this manner, service map 600 may form a dependency graph indicating the dependencies of applications 112.

Mapping module 144 may include other edges, such as edges 518, in service map 600. For example, mapping module 144 may include edges 518 representing relationships (e.g., connections, dependencies) between nodes of service map 600. For instance, in the example of FIG. 6, mapping module 144 includes edges 518 between application layer nodes 512 and compute layer nodes 610A-610N (collectively, "compute layer nodes 610") indicating applications 112 are executing at respective compute nodes 110. To illustrate, edges 518 connect node 610A to nodes 512A-512C and node 610A to nodes 512D-512F respectively indicating that applications 112A-112C execute at compute node 110A and applications 112D-112F execute at compute node 110B. Similar to edges 516, mapping module 144 may include a directional or other indicator at edges 518, such as to indicate a dependency between applications 112. For example, in FIG. 6, mapping module 144 includes an arrow at edges 518 to indicate the dependency of applications 112 on respective compute nodes 110. Mapping module 144 may determine one or more applications of applications 112 that execute at a compute node of compute nodes 110, such as for the purpose of generating service map 600, based on the service information.

As alluded to above, mapping module 144 may include, in service map 600, indications of cross-layer dependencies of application layer nodes 512, compute layer nodes 610, and network layer nodes 612A-612N (collectively, "network layer nodes 612") in a computing infrastructure 100 or data center environment (e.g., data center 101 of FIG. 1). As shown in the example of FIG. 6 for instance, mapping module 144 may generate service map 600 including network layer nodes 612 in addition to application layer nodes 512 and compute layer nodes 610. Mapping module 144 may, in some examples, obtain a mapping of network layer nodes 612 from a knowledge graph about network devices in the data center environment and include the obtained network layer nodes 612 in service map 600.

Mapping module 140 may generate service map 600 with an application layer including application layer nodes 512, a compute layer including compute layer nodes 610, and a network layer including network layer nodes 612, or various subsets thereof. Compute layer nodes 610 may represent computing devices, such as compute nodes 110. Network layer nodes 612 may represent networking devices, such as TOR switches 16 and chassis switches 18. In some examples, application layer nodes 512 may correspond to multiple, distributed services or network applications. In some examples, each application layer node 512 may include multiple instances that are hosted on distributed compute nodes 110 in the compute layer of service map 600. Each of compute nodes 110 may include bare metal servers, computing devices, virtual machines, or the like. Compute nodes 110 may be connected to a TOR switch of TOR switches 16 in the network layer. TOR switches 16 may be coupled to one or more chassis switches of chassis switches 18 in the network layer.

Figure 7:
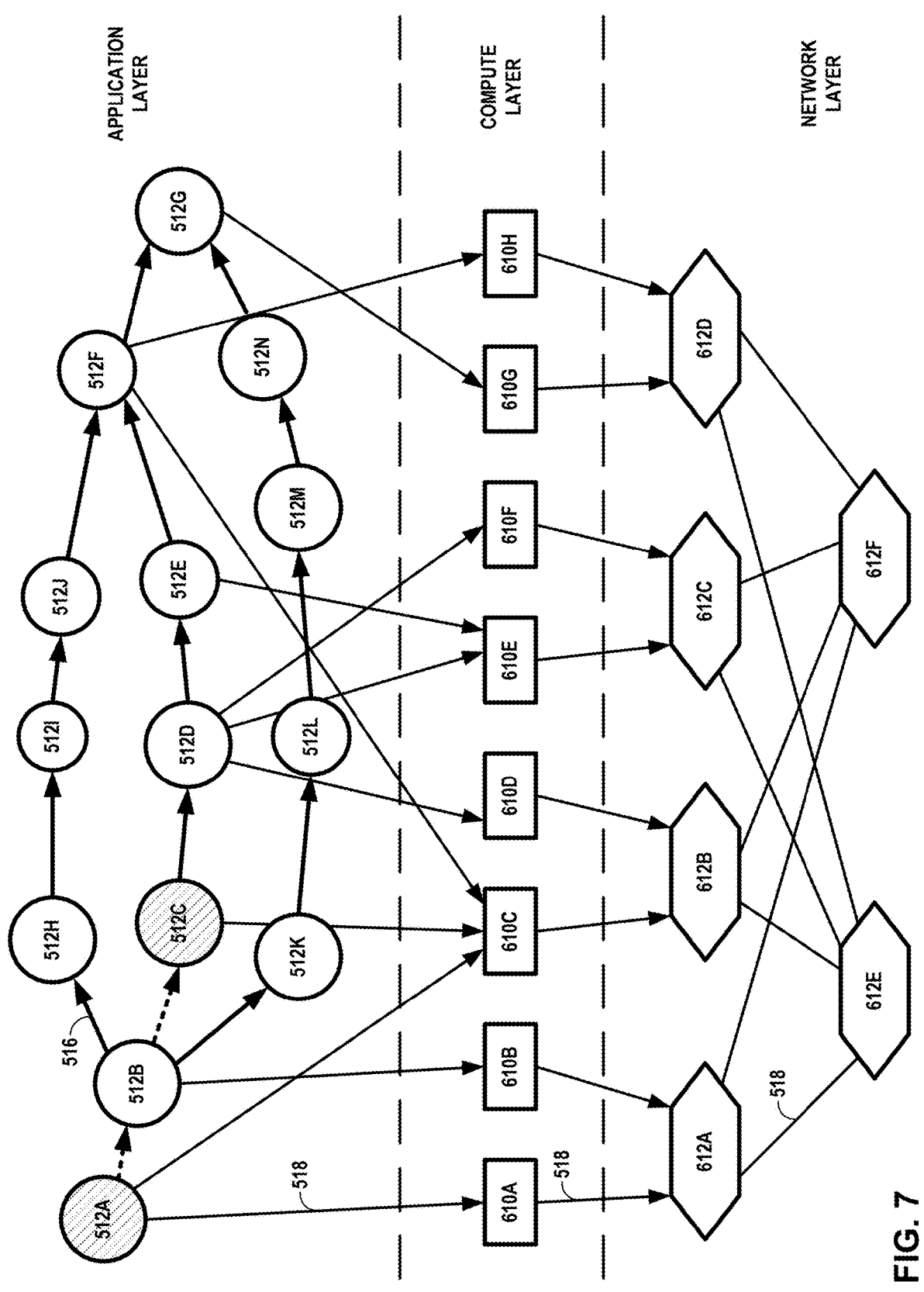
FIG. 7 is a block diagram illustrating a second example of a service map, according to techniques of this disclosure.

FIG. 7 is a block diagram illustrating a second example of a service map 600, according to techniques of this disclosure. As can be seen, service map 600 may include any number of nodes, such as to reflect various computing infrastructures 100, including complex enterprise computing infrastructures. Similar to service map 600 of FIG. 6, service map 600 of FIG. 7 may include an application layer and compute layer respectively including application layer nodes 512 and compute layer nodes 610. Service map 600 may also include network layer including network layer nodes 612. Edges 516, 518, may indicate relationships (e.g., connections, dependencies) between nodes, including between various layers of nodes. As can be seen, edges 516, 518 may include indications of dependencies, such as through an arrow or other directional indicator. For example, application layer node 512A may depend on application layer node 512B and application layer node 512B may depend on application layer node 512C, and so on. Application layer node 512A may depend also on compute layer node 610A and compute layer node 610A may depend on network layer nodes 612A, 612E, 612F. As described above, application layer nodes 512 may represent applications 112, compute layer nodes 610 may represent compute nodes 110, and network layer nodes 612 may represent network devices, such as TOR switches 16 and/or chassis switches 18.

Analysis system 140 may apply anomaly detection engine 238 to determine anomalies (e.g., high latency) associated with application layer nodes 512. In some examples, anomaly detection engine 238 may run periodically or in response to user input to determine anomalies. Anomaly detection engine 238 may determine anomalies from performance metrics 238 collected by analysis engine 146 for applications 112 represented by application layer nodes 512, such as described above. Performance metrics 238 may include KPIs monitored for layers of computing infrastructure 100 and/or data center 101. Anomaly detection engine 238 may determine an anomaly exists when a KPI satisfies (e.g., exceeds or does not exceed) a corresponding KPI threshold. For example, anomaly detection engine 238 may determine an anomaly exists at application layer node 512A when latency at the application layer node 512A (e.g., responsiveness of application 112 represented by application layer node 512A) exceeds a latency threshold (e.g., 100 ms). Analysis system 140 may indicate any identified anomalies within service map 600. For example, analysis system 140 may display an indication of the anomaly at or adjacent to the graphical representation of application layer node 512 (or other node or edge) at which the anomaly was detected. In the example of FIG. 7 for instance, application layer nodes 512A, 512C are striped to indicate an anomaly is present for the applications 112 represented by application layer nodes 512A, 512C. Similarly, edges 516 between application layer nodes 512A, 512B, 512C are shown in broken lines, such as to indicate the presence of an anomaly at or relating to these edges 516 or corresponding (e.g., connected) nodes 512.

Analysis system 140, such as through analysis engine 146, may utilize service map 600 to troubleshoot anomalies. For example, upon detecting an anomaly at application 112 represented by application layer node 512A, analysis engine 146 may apply anomaly detection engine 234 to one or more applications 112 as indicated by the dependency graph of service map 600. For example, when an anomaly is detected at application layer node 512A, analysis engine 146 may apply anomaly detection engine 234 to applications 112 represented by application layer nodes 512B, 512C. Analysis engine 146 may traverse application layer nodes 512, compute layer nodes 610, and/or network layer nodes 612 of service map 600 to troubleshoot an anomaly. Continuing the above example, analysis engine 146 may traverse application layer nodes 512B, 512C of service map 600, and apply anomaly detection engine 146 at each node.

Analysis engine 146 may traverse multiple layers in some cases. Continuing the above example for instance, analysis engine 146 may traverse from application layer node 512A to compute layer node 610A, network layer nodes 612A, 612E, 612F, or both and apply anomaly detection engine 146 at each node. Anomaly detection engine 146 may determine if any anomalies exist at the application 112, compute node 110 or network device represented by the respective node 512, 610, 612. For example, anomaly detection engine 146 may compare one or more KPIs to corresponding KPI thresholds and determine an anomaly exists when a KPI exceeds a corresponding KPI threshold.

By traversing the dependency graph of service map 600, analysis engine 146 may determine a root cause of an anomaly. As shown in FIG. 7 for example, analysis engine 146 may initially determine an anomaly exists (e.g., high latency) at application 112 represented by application layer node 512A. Analysis engine 146 may traverse the dependencies (e.g., server applications) of application layer node 512A. For illustration, anomaly detection engine 146 may determine no anomalies exist at application 112 represented by application layer node 512B (e.g., latency is below the KPI threshold), but may determine that an anomaly does exist at application 112 represented by application layer node 512C, or may determine that an anomaly exists at both application layer nodes 512B, 512C. For example, applications 112 represented by application layer node 512C and/or application layer node 512B may have anomalous latency due to excessive load at their respective compute nodes 610B, 610C, unresponsiveness of or errors at applications 112 themselves, or an issue with network devices represented by network layer nodes 612 at the network layer. In this example, addressing the anomaly at application layer nodes 512B/512C may correct anomalies detected at application layer nodes 512 that depend on application layer nodes 512B/512C (e.g., application layer node 512A).

FIG. 8 is a flowchart illustrating an example process for rendering service maps 600 for distributed native applications, according to techniques of this disclosure. In some examples, aspects of FIG. 8 may be performed by analysis system 140. As described above, analysis system 140 may include storage system 205 with a storage device storing process information and connection information collected by one or more host modules 114 at compute nodes 110.

Analysis system 140 may associate, with each connection of one or more connections identified in the connection information, one or more applications 112 (802). Each of the one or more applications 112 may be an application of a plurality of applications identified in the process information. Analysis system 140 may associate each connection of the one or more connections to one or more applications 112 based at least on a PID of the connection information. For example, analysis system 140 may match the PID of a connection to the PID of an application to associate the connection to the application.

Analysis system 140 may determine whether each of one or more applications 112 is a server application 112N or a client application 112A based on the one or more connections (804). To determine whether each of one or more applications 112 is a server application or a client application based on the one or more connections, analysis system 140 may determine whether each of the one or more connections is a listening connection. Analysis system 140 may determine that applications 112 with a listening connection are server applications and applications 112 without a listening connection (e.g., an established connection) are client applications.

Analysis system 140 may generate a service map 600 comprising an edge 516 representing each connection of the one or more connections and a node 512 representing each server application 112N and each client application 112A of one or more applications 112 (806). At least one server application 112N and at least one client application 112A of one or more applications 112 may be part of a network application, such as a native network application. In some examples, at least one server application 112N and at least one client application 112A of one or more applications 112 may respectively be a backend application and a frontend application.

Analysis system 140 may include, at one or more edges 516, an indication of dependency between at least one client application 112A of the one or more applications 112 and at least one server application 112N of the one or more applications 112. In some examples, the nodes 512 representing each server application 112N and each client application 112A of one or more applications 112 may be application layer nodes. Analysis system 140 may include one or more compute layer nodes representing at least one of the one or more compute nodes in service map 600.

Analysis system 140 may output an indication of service map 600 (808). For example, analysis system 140 may generate data for user interface 235 including a graphical representation of service map 600. Output device 218 may display the user interface 235 to output the indication of service map 600. For example, output device 218 may present user interface 236 including the graphical representation of service map 600 to a user, such as on a screen or display of output device 218. In some examples, analysis system 140 may send the indication of service map 600 to another device for presentation. For instance, analysis system 140 may send the indication of service map 600 to a user's device (e.g., laptop, desktop, mobile device) and the user's device may present a user interface and/or service map 600 via an output device (e.g., screen) of the user's device.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combination of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method (e.g., when the instructions are executed). Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

What is claimed is:

1. A system comprising:
   a first compute node and a second compute node of a plurality of compute nodes executing a plurality of applications communicating using a plurality of connections, each compute node of the first compute node and the second compute node configured to:
   determine process identifiers for respective applications executed by the compute node;

generate process information for the compute node identifying the applications executed by the compute node; and obtain, based on the process identifiers, connection information for the compute node associated with the applications executed by the compute node, wherein the connection information for the compute node identifies one or more connections associated with the applications executed by the compute node;

an analysis system comprising:

a storage device including process information and connection information collected at a plurality of compute nodes; and processing circuitry in communication with the storage device, wherein the processing circuitry is configured to:

collect the process information for the first compute node and the connection information for the first compute node;

collect the process information for the second compute node and the connection information for the second compute node;

associate, based on the process information for the first compute node, the connection information for the first compute node, the process information for the second compute node, and the connection information for the second compute node, a connection of the one or more connections identified in the connection information for the first compute node with an application of the applications executed by the second compute node that communicates using the connection;

generate a service map comprising edges and nodes, wherein each of the edges represents a corresponding connection of the plurality of connections and connects a corresponding first node of the nodes representing a corresponding server application of the plurality of applications and a second node of the nodes representing a corresponding client application of the plurality of applications that communicates with the server application using the corresponding connection, wherein an edge of the edges represents the connection and a node of the nodes connected by the edge represents the application of the applications executed by the second compute node; and output an indication of the service map.

2. The system of claim 1, wherein the processing circuitry is further configured to:

determine whether each of the plurality of applications is a server application or a client application based on whether a corresponding connection of the plurality of connections is a listening connection, wherein each of the plurality of applications is the server application when the corresponding connection is the listening connection.

3. The system of claim 1, wherein to associate the connection of the one or more connections identified in the connection information for the first compute node with the application of the applications executed by the second compute node that communicates using the connection, the processing circuitry is further configured to correlate a process identifier of the connection information for the first compute node to a process identifier of the process information for the second compute node based on the connection information for the first compute node and the connection information for the second compute node.

4. The system of claim 1, wherein each of the edges includes an indication of dependency between the corresponding first node and the corresponding second node.

5. The system of claim 1, wherein at least one server application and at least one client application of the plurality of applications are part of a network application.

6. The system of claim 1, wherein at least one server application and at least one client application of the plurality of applications are respectively a backend application and a frontend application.

7. The system of claim 1, wherein:

the nodes representing each server application and each client application of the plurality of applications are application layer nodes; and to generate the service map, the processing circuitry is further configured to include one or more compute layer nodes representing at least one of the plurality of compute nodes.

8. The system of claim 1, wherein the processing circuitry is further configured to:

identify, based on performance metrics for the plurality of applications, an anomaly;

determine, based on the service map, a root cause of the anomaly; and based on the root cause of the anomaly, remediate the anomaly, wherein to remediate the anomaly, the processing circuitry is configured to at least one of:

re-deploy at least one of the plurality of applications, reconfigure a network device of a switch fabric connecting the plurality of compute nodes, or re-start one or more of the plurality of applications.

9. The method of claim 1, further comprising:

identifying, by the processing circuitry of the analysis system and based on performance metrics for the plurality of applications, an anomaly;

determining, by the processing circuitry of the analysis system and based on the service map, a root cause of the anomaly; and based on the root cause of the anomaly, remediating, by the processing circuitry of the analysis system, the anomaly, remediating the anomaly comprises at least one of:

re-deploying at least one of the plurality of applications, reconfiguring a network device of a switch fabric connecting the plurality of compute nodes, or re-starting one or more of the plurality of applications.

10. A method comprising:

by each compute node of a first compute node and a second compute node of a plurality of compute nodes executing a plurality of applications communicating using a plurality of connections:

determining process identifiers for respective applications executed by the compute node;

generating process information for the compute node identifying the applications executed by the compute node; and obtaining, and based on the process identifiers, connection information for the compute node associated with the applications executed by the compute node, wherein the connection information for the compute node identifies one or more connections associated with the applications executed by the compute node;

collecting, by an analysis system, the process information for the first compute node and the connection information for the first compute node;

collecting, by the analysis system, the process information for the second compute node and the connection information for the second compute node;

associating, by the analysis system and based on the process information for the first compute node, the connection information for the first compute node, the process information for the second compute node, and the connection information for the second compute node, a connection of the one or more connections identified in connection information for the first compute node with an application of the applications executed by the second compute node that communicates using the connection;

generating, by the analysis system, a service map comprising edges and nodes, wherein each of the edges represents a corresponding connection of the plurality of connections and connects a corresponding first node of the nodes representing a corresponding server application of plurality of applications and a second node of the nodes representing a corresponding client application of the plurality of applications that communicates with the server application using the corresponding connection, wherein an edge of the edges represents the connection and a node of the nodes connected by the edge represents the application of the applications executed by the second compute node; and outputting, by the analysis system, an indication of the service map.

11. The method of claim 10, further comprising:

determining whether each of the plurality of applications is a server application or a client application based on the whether a corresponding connection of the plurality of connections is a listening connection, wherein each of the plurality of applications is the server application when the corresponding connection is the listening connection.

12. The method of claim 10, wherein associating, the connection of the one or more connections identified in the connection information for the first compute node with the application of the applications executed by the second compute node that communicates using the connection further comprises correlating a process identifier of the connection information for the first compute node to a process identifier of the process information for the second compute node based on the connection information for the first compute node and the connection information for the second compute node.

13. The method of claim 10, wherein each of the edges includes an indication of dependency between the corresponding first node and the corresponding second node.

14. The method of claim 10, wherein at least one server application and at least one client application of the plurality of applications are part of a network application.

15. The method of claim 10, wherein at least one server application and at least one client application of the plurality of applications are respectively a backend application and a frontend application.

16. The method of claim 10, wherein:

the nodes representing each server application and each client application of the plurality of applications are application layer nodes; and generating the service map comprises including one or more compute layer nodes representing at least one of the plurality of compute nodes.

17. Non-transitory computer-readable storage media storing instructions that, when executed, cause processing circuitry to:

for each compute node of a first compute node and a second compute node of a plurality of compute nodes executing a plurality of applications communicating using a plurality of connections:

determine process identifiers for respective applications executed by the compute node;

generate process information for the compute node identifying the applications executed by the compute node; and obtain, based on the process identifiers, connection information for the compute node associated with the applications executed by the compute node, wherein the connection information for the compute node identifies one or more connections associated with the applications executed by the compute node;

collect the process information for the first compute node and the connection information for the first compute node;

collect the process information for the second compute node and the connection information for the second compute node;

associate, based on the process information for the first compute node, the connection information for the first compute node, the process information for the second compute node, and the connection information for the second compute node, a connection of the one or more connections identified in the connection information for the first compute node, with an application of the applications executed by the second compute node that communicates using the connection;

generate a service map comprising edges and nodes, wherein each of the edges represents a corresponding connection of the plurality of connections and connects a corresponding first node of the nodes representing a corresponding server application of the plurality of applications and a second node of the nodes representing a corresponding client application of the plurality of applications that communicates with the server application using the corresponding connection, wherein an edge of the edges represents the connection and a node of the nodes connected by the edge represents the application of the applications executed by the second compute node; and output an indication of the service map.

18. The non-transitory computer-readable storage media of claim 17, wherein the instructions further cause the processing circuitry to:

determine whether each of the plurality of applications is a server application or a client application based on whether a corresponding connection of the plurality of connections is a listening connection, wherein each of the plurality of applications is the server application when the corresponding connection is the listening connection.

19. The non-transitory computer-readable storage media of claim 17, wherein to associate the connection of the one or more connections identified in the connection information for the first compute node with the application of the applications executed by the second compute node, the instructions further cause the processing circuitry to correlate a process identifier of the connection information for the first compute node to a process identifier of the process information for the second compute node based on the connection information for the first compute node and the connection information for the second compute node.

20. The non-transitory computer-readable storage media of claim 17, wherein each of the edges includes an indication of dependency between the corresponding first node and the corresponding second node.

* * * * *